(12) United States Patent
Wang et al.

(10) Patent No.: US 12,572,658 B2
(45) Date of Patent: Mar. 10, 2026

(54) DIRECTED GRAPH TRANSFORMERS

(71) Applicants: International Business Machines Corporation, Armonk, NY (US); Rensselaer Polytechnic Institute, Troy, NY (US)

(72) Inventors: Qitong Wang, Troy, NY (US); Georgios Kollias, White Plains, NY (US); Theodoros Salonidis, Wayne, PA (US); Vasileios Kalantzis, White Plains, NY (US); Naoki Abe, Rye, NY (US)

(73) Assignees: International Business Machines Corporation, Armonk, NY (US); Rensselaer Polytechnic Institute, Troy, NY (US)

( * ) Notice: Subject to any disclaimer, the term of this patent is extended or adjusted under 35 U.S.C. 154(b) by 84 days.

(21) Appl. No.: 18/240,345

(22) Filed: Aug. 30, 2023

(65) Prior Publication Data

US 2025/0077670 A1 Mar. 6, 2025

(51) Int. Cl.
*G06F 21/56* (2013.01)

(52) U.S. Cl.
CPC ...... *G06F 21/566* (2013.01); *G06F 2221/033* (2013.01)

(58) Field of Classification Search
CPC .......... G06N 3/08; G06N 99/005; G06N 7/00; G06F 17/30958; G06F 21/566; G06F 2221/033
See application file for complete search history.

(56) References Cited

U.S. PATENT DOCUMENTS

| | | |
|---|---|---|
| 11,321,541 B2 | 5/2022 | Wu |
| 11,507,099 B2 | 11/2022 | Stetson |

(Continued)

FOREIGN PATENT DOCUMENTS

| | | |
|---|---|---|
| CN | 113722510 A | 11/2021 |
| CN | 114091772 A | 2/2022 |

(Continued)

OTHER PUBLICATIONS

Peihao Wang. Learning to Grow Pretrained Models for Efficient Transformer Training. arXiv:2303.00980v1 [cs.LG] Mar. 2, 2023. Pages.

(Continued)

*Primary Examiner* — Paul E Callahan
(74) *Attorney, Agent, or Firm* — Caleb Wilkes; Otterstedt & Kammer PLLC

(57) ABSTRACT

Source and target vectors encode roles of a node in a directed graph as a source and a target role respectively. Source and target query matrices and source and target key matrices are learned based on the directed graph. The source query matrix and the target key matrix are projected and scaled to create a source-target attention matrix and the target query matrix and the source key matrix are projected and scaled to create a target-source attention matrix. The attention matrices are combined to generate a source-target vector-edge encoding and a target-source vector-edge encoding, and are also biased and gated to generate a modified source-target attention matrix and a modified target-source attention matrix, respectively. Source encodings and target encodings are generated using the modified attention matrices. A classification task is performed with respect to the obtained directed graph based on the generated source encodings and the generated target encodings.

20 Claims, 5 Drawing Sheets

(56) References Cited

U.S. PATENT DOCUMENTS

| | | | | | |
|---|---|---|---|---|---|
| 11,809,993 | B2 * | 11/2023 | Al-Rfou | ................ | G06N 3/045 |
| 2024/0296324 | A1 | 9/2024 | Kollias et al. | | |

FOREIGN PATENT DOCUMENTS

| | | |
|---|---|---|
| CN | 114780619 A | 7/2022 |
| CN | 115604480 A | 1/2023 |
| EP | 2731022 A | 5/2014 |
| EP | 2924560 A | 9/2015 |

OTHER PUBLICATIONS

Dwivedi, V.P. and Bresson, X., 2020. A generalization of transformer networks to graphs. arXiv preprint arXiv:2012.09699.

Hussain, M.S., Zaki, M.J. and Subramanian, D., 2022, August. Global self-attention as a replacement for graph convolution. In Proceedings of the 28th ACM SIGKDD Conference on Knowledge Discovery and Data Mining (pp. 655-665).

Kollias, G., Kalantzis, V., Ide, T., Lozano, A. and Abe, N., 2022, June. Directed Graph Auto-Encoders. In Proceedings of the AAAI Conference on Artificial Intelligence (vol. 36, No. 7, pp. 7211-7219).

Peter Mell and Timothy Grance, The NIST Definition of Cloud Computing, NIST Special Publication 800-145, Sep. 2011, cover, pp. i-iii and 1-3.

Achanta et al., "SLIC Superpixels Compared to State-of-the-Art Superpixel Methods", IEEE Transactions on Pattern Analysis and Machine Intelligence, May 29, 2012, pp. 2274-2282.

Beaini et al., "Directional graph networks", arXiv:2010.02863v4 [cs.LG], Apr. 7, 2021, 23 pages.

Bruna et al., "Spectral networks and deep locally connected networks on graphs.", arXiv:1312.6203v3 [cs.LG], May 21, 2014, 14 pages.

Defferrard et al., "Convolutional neural networks on graphs with fast localized spectral filtering", arXiv:1606.09375v3 [cs.LG], Feb. 7, 2017, 9 pages.

Dwivedi et al., "Benchmarking Graph Neural Networks", arXiv:2003.00982v5 [cs.LG], Dec. 28, 2022, 49 pages.

Fey et al., "Fast Graph Representation Learning with PyTorch Geometric", arXiv:1903.02428v3 [cs.LG], Apr. 25, 2019, 9 pages.

Gilmer et al., "Neural message passing for quantum chemistry", arXiv:1704.01212v2 [cs.LG], Jun. 12, 2017, 14 pages.

He et al., "DIGRAC: Digraph Clustering Based on Flow Imbalance", arXiv:2106.05194v8 [stat.ML], Nov. 29, 2022, 43 pages.

He et al., "PyTorch Geometric Signed Directed: A Software Package on Graph Neural Networks for Signed and Directed Graphs", arXiv:2202.10793v6 [cs.LG], Nov. 23, 2023, 27 pages.

Kipf et al., "Semi-Supervised Classification with Graph Convolutional Networks", arXiv:1609.02907v4 [cs.LG], Feb. 22, 2017, 14 pages.

Kipf et al., "Variational Graph Auto-Encoders", arXiv:1611.07308v1 [stat.ML], Nov. 21, 2016, 3 pages.

Kleinberg et al., "Authoritative sources in a hyperlinked environment", Journal of the ACM (JACM), Sep. 1, 1999, pp. 604-632.

Malliaros et al., "Clustering and community detection in directed networks: A survey", arXiv:1308.0971v1 [cs.SI], Aug. 5, 2013, 86 pages.

Mcauley et al., "Learning to discover social circles in ego networks", NIPS'12: Proceedings of the 26th International Conference on Neural Information Processing Systems—vol. 1, Dec. 3, 2012, pp. 539-547.

Micheli et al., "Neural network for graphs: A contextual constructive approach", IEEE Transactions on Neural Networks, Mar. 1, 2009, pp. 498-511.

Min et al., "Transformer for Graphs: An Overview from Architecture Perspective", arXiv:2202.08455v1 [cs.LG], Feb. 17, 2022, 8 pages.

Morris et al., "TUDataset: A collection of benchmark datasets for learning with graphs", arXiv:2007.08663 [cs.LG], Jul. 16, 2020, 11 pages.

Niepert et al., "Learning convolutional neural networks for graphs", arXiv:1605.05273v4 [cs.LG], Jun. 8, 2016, 10 pages.

Salha et al., "Gravity-Inspired Graph Autoencoders for Directed Link Prediction", arXiv:1905.09570v5 [cs.LG], Jun. 6, 2022, 10 pages.

Tong et al., "Digraph Inception Convolutional Networks", Advances in Neural Information Processing Systems 33 (NeurIPS 2020), Jan. 2020, pp. 17907-17918.

Tong et al., "Directed Graph Convolutional Network", arXiv:2004.13970v1 [cs.LG], Apr. 29, 2020, 10 pages.

Vaswani et al., "Attention Is All You Need", arXiv:1706.03762v7 [cs.CL], Aug. 2, 2023, 15 pages.

Velickovic et al., "Graph Attention Networks", arXiv:1710.10903v3 [stat.ML], Feb. 4, 2018, 12 pages.

Ying et al., "Do transformers really perform badly for graph representation?", arXiv:2106.05234v5 [cs.LG], Nov. 24, 2021, 19 pages.

Zhang et al., "Graph-Bert: Only Attention is Needed for Learning Graph Representations", arXiv:2001.05140v2 [cs.LG], Jan. 22, 2020, 10 pages.

Zhang et al., "Magnet: A neural network for directed graphs", arXiv:2102.11391v2 [cs.LG], Jun. 11, 2021, 22 pages.

* cited by examiner

| Model | FlowGraph2 | FlowGraph3 | FlowGraph5 | Conventional Social Network 3 | Conventional Social Network 5 | Conventional Handwritten Digits | Conventional Images |
|---|---|---|---|---|---|---|---|
| GCN | 50.77 +/- 0.70 | 34.73 +/- 0.52 | 17.07 +/- 0.14 | 35.09 +/- 0.66 | 21.16 +/- 0.33 | 85.61 +/- 0.36 | 50.85 +/- 0.12 |
| DiGCN | 52.83 +/- 0.47 | 35.47 +/- 0.95 | 17.89 +/- 0.13 | 41.18 +/- 0.51 | 25.12 +/- 0.18 | 90.78 +/- 0.37 | 56.42 +/- 0.41 |
| Conventional | 95.92 +/- 0.72 | 71.67 +/- 0.13 | 42.78 +/- 1.03 | 86.49 +/- 0.73 | 73.94 +/- 1.47 | 98.17 +/- 0.09 | 68.70 +/- 0.41 |
| DiGT | 96.92 +/- 0.31 | 75.67 +/- 0.54 | 44.56 +/- 1.23 | 89.69 +/- 0.77 | 77.54 +/- 0.93 | 96.71 +/- 0.20 | 68.41 +/- 0.96 |

*FIG. 3A*

| Model | FlowGraph3 | Conventional Social Network 5 | Conventional Handwritten Digits |
|---|---|---|---|
| DiGT-Node Local | 73.67 +/- 0.72 | 84.47 +/- 1.52 | 95.95 +/- 0.21 |
| DiGT-Edge Local | 42.10 +/- 0.56 | 84.99 +/- 0.93 | 96.97 +/- 0.19 |
| DiGT | 75.67 +/- 0.54 | 77.54 +/- 0.93 | 96.71 +/- 0.20 |

*FIG. 3B*

| Model | FlowGraph3 | Conventional Social Network 5 | Conventional Handwritten Digits |
|---|---|---|---|
| DiGT-Random Node Embedding | 75.78 +/- 1.36 | 75.52 +/- 0.21 | 96.56 +/- 0.12 |
| DiGT-Random Edge Embedding | 34.66 +/- 3.12 | 75.07 +/- 1.46 | 96.76 +/- 0.35 |
| DiGT-Single Node Embedding | 73.89 +/- 0.44 | 75.45 +/- 0.75 | 97.49 +/- 0.39 |
| DiGT | 75.67 +/- 0.54 | 77.54 +/- 0.93 | 96.71 +/- 0.20 |

*FIG. 3C*

DIRECTED GRAPH TRANSFORMERS

BACKGROUND

The present invention relates generally to the electrical, electronic and computer arts and, more particularly, to machine learning and transformers for machine learning.

SUMMARY

Principles of the invention provide systems and techniques for directed graph transformers. In one aspect, an exemplary method includes the operations of obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer: based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification task with respect to the obtained directed graph based on the generated source encodings and the generated target encodings.

In one aspect, a computer program product comprises one or more tangible computer-readable storage media and program instructions stored on at least one of the one or more tangible computer-readable storage media, the program instructions executable by a processor, the program instructions comprising obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer: based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification based on the obtained directed graph based on the generated source encodings and the generated target encodings.

In one aspect, an apparatus comprises a memory and at least one processor, coupled to the memory, and operative to perform operations comprising obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer: based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification task with respect to the obtained directed graph based on the generated source encodings and the generated target encodings.

As used herein, "facilitating" an action includes performing the action, making the action easier, helping to carry the action out, or causing the action to be performed. Thus, by way of example and not limitation, instructions executing on a processor might facilitate an action carried out by instructions executing on a remote processor, by sending appropriate data or commands to cause or aid the action to be performed. Where an actor facilitates an action by other than performing the action, the action is nevertheless performed by some entity or combination of entities.

These and other features and advantages will become apparent from the following detailed description of illustrative embodiments thereof, which is to be read in connection with the accompanying drawings.

BRIEF DESCRIPTION OF THE DRAWINGS

The following drawings are presented by way of example only and without limitation, wherein like reference numerals (when used) indicate corresponding elements throughout the several views, and wherein:

FIG. 3A-3C are tables showing results of experiments conducted with the directed graph transformer, in accordance with an example embodiment;

Figure 1A:
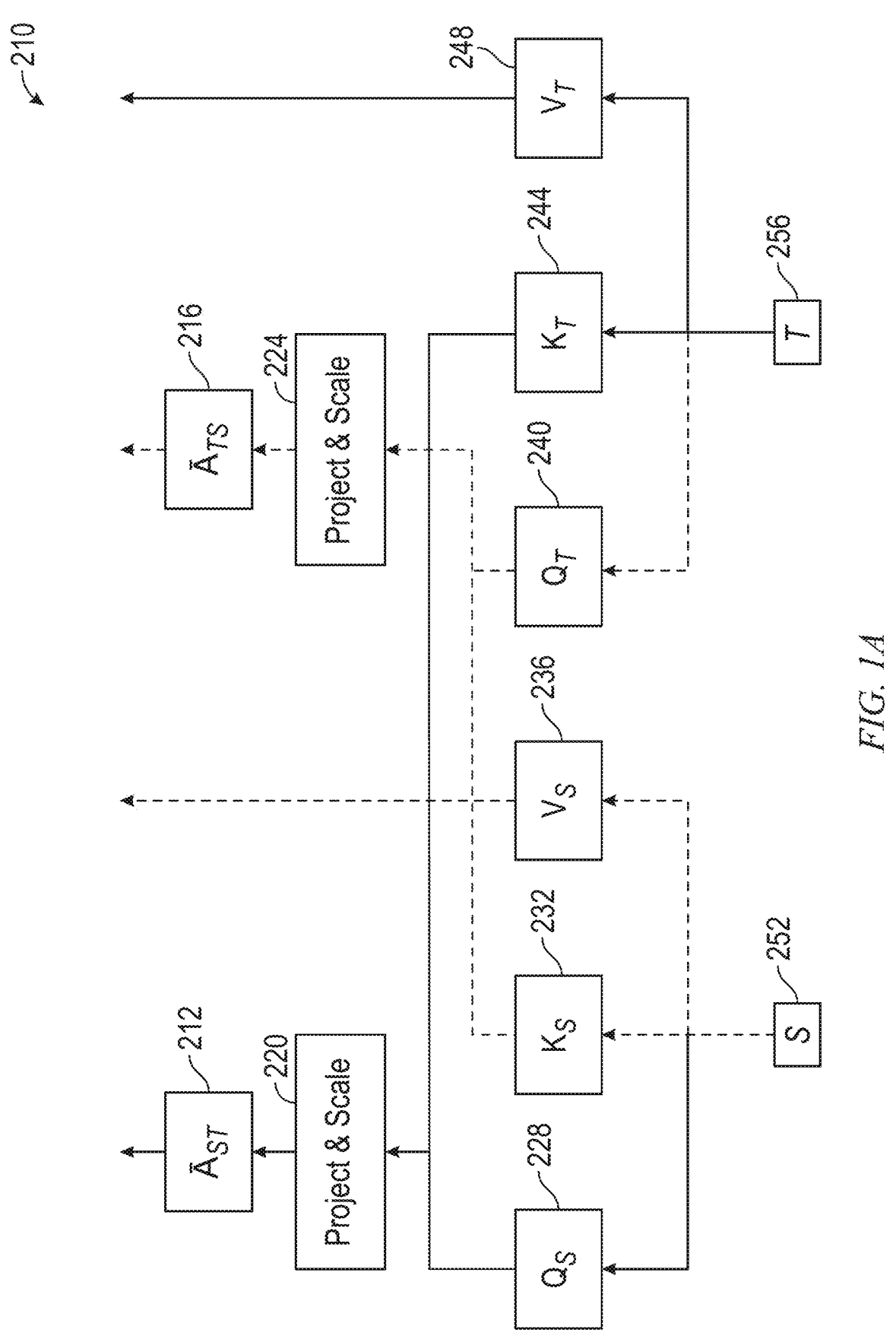
FIGS. 1A and 1B are a high-level block diagram of a directed graph transformer, in accordance with an example embodiment.

It is to be appreciated that elements in the figures are illustrated for simplicity and clarity. Common but well-understood elements that may be useful or necessary in a commercially feasible embodiment may not be shown in order to facilitate a less hindered view of the illustrated embodiments.

DETAILED DESCRIPTION

Principles of inventions described herein will be in the context of illustrative embodiments. Moreover, it will become apparent to those skilled in the art given the teachings herein that numerous modifications can be made to the embodiments shown that are within the scope of the claims. That is, no limitations with respect to the embodiments shown and described herein are intended or should be inferred.

Neural network architectures are state-of-the-art approaches for graph processing. Graph Neural Networks (GNNs) are the workhorses of machine learning on graphs and produce high-quality, graph-aware representations, typically, of nodes. These have been successfully used in downstream learning tasks including node classification, edge prediction, graph regression and classification, and the like. GNNs can be described as message passing architectures where messages are exchanged only along existing graph structure edges. The updating of a node representation is a function of received representations from nodes in the immediate neighborhood of the node. It is noted that, while adding or removing edges could facilitate learning, not all existing edges may be that important for update exchanges.

Transformers as machine learning models can be viewed as GNNs. Graph neural networks have fixed edges while graph transformers dynamically learn edge connections. The latter is a pertinent feature as it is critical to capture edge direction in graphs when complex data relationships are inherently unsymmetric. Significant examples include connected node sets that can be partially ordered by time, causality and flow constraints. It is noted that failure to learn the correct edge direction generates confusing inconsistencies (cause chronologically happens before its effect, non-monotonic timestamps in histories) and impairs invariants (conservation law violations for flow networks) in ways that are difficult to reconcile by post-processing.

Generally, techniques are disclosed for directed graph transformers. Most existing graph transformers do not take directionality into account and mostly capture distances between graph nodes. This is a limiting assumption as numerous graph applications utilize directed graphs and require capturing sophisticated relationships in graph data, such as time, causality or generic dependency constraints that are pertinent to several use cases. A novel graph transformer architecture is introduced that explicitly takes into account directionality. Extensive experiments on synthetic and real graph datasets on the task of graph classification show that one or more exemplary embodiments can have accuracy gains over state-of-the-art graph transformer approaches. In example embodiments, dual embeddings enable latent connections between nodes not in the original graph and thereby increase the performance of characterizing a connected graph.

Introduction

Graphs are one of the most general and versatile data structures encountered in diverse domains, ranging from interaction networks in biology, to networks of social and financial transactions. A graph introduces dependencies between its nodes, so representing nodes with feature vectors and invoking algorithms on those vectors in isolation could be a suboptimal solution strategy for graph problems. One or more embodiments advantageously provide rich vector representations for the nodes, capturing both their attributes and their embedding structure, which allows the strategy to perform better than simple graph algorithms.

Graph Convolutional Networks (GCNs) produce high-quality, graph-aware representations of nodes and have been successfully used in downstream learning tasks including node classification, link prediction and graph classification. GCNs fall into two categories: spatial and spectral. Spatial GCNs can be described as message-passing neural networks (MPNNs) aggregating information from neighbor graph nodes. They adopt a local view of the graph structure around each node and are easy to describe and compute with; however, they also need local modifications to enhance the performance of the representations they produce for downstream learning tasks. Spectral GCNs first appeared in graph signal processing. Their description is well dependent on the notion of graph Laplacian, so they adopt a global graph view. However, they incur more computational cost, typically addressed by approximating their convolutional filter. This approximation amounts to restricting the filter aperture, so the graph view essentially becomes local in practice. The limitation was recognized in Graph Attention Networks (GATs): the more general formulation of the model allows learning the affinity (attention) of any pair of graph nodes from scratch, by dropping all structural information, but they invariably consider injecting the graph structure by performing masked attention.

The idea of learning the representation of entities without enforcing the inductive bias of how these are organized, was popularized in Transformer architecture. Transformers originated in Natural Language Processing (NLP) applications, where the entities/nodes are entities organized in a sequence. Dropping this regular, non-rich, structural information and starting from scratch (with the possible exception of the positional encoding (PE) vector that is added to the input; PE is a loose representation of original sequence order at different granularities/frequencies) allowed learning interesting latent long-range inter-node connections that would not be possible to recover under the sequence prior constraint. A pertinent module of Transformer architecture is multi-head attention: each head submodule expresses the encoding of a node as a linear combination of all nodes' encodings; the coefficients in the combination (attention coefficients) are their normalized projections along the direction of the node's encoding. This is a dynamic attention mechanism in contrast to standard GCNs where the attention is hardwired in static edge weights between nodes.

Transformers can be viewed as GNNs and are the state-of-the-art architectures for Natural Language Processing (NLP). The transformer inputs are token (nodes) representations organized in a sequence where the updating of a node representation is a function of a linear combination of all node vector representations (embeddings) (coefficients in the sum are inner products of embeddings). Sequence structure is induced by adding a positional encoding (PE) of a node to its initial embedding. (Multiple linear combinations are merged at each layer of the Transformer architecture (multi-head attention).)

Transformers can be adapted for graph learning as graph transformers which are particularly effective for graph-level tasks. The underlying graph is considered complete: all-to-all message passing at each update step. The edge weights are functions of connected node embeddings and are dynamic. Node embeddings are used for computing (multi-head) attention between graph nodes (node channels). Edge embeddings are used for modifying attention by biasing or gating individual attention coefficients (edge channels). The graph structure can be induced explicitly by localizing node interactions or filtering out non-existent edges (local attention). The graph structure can be input only implicitly (PEs, node centralities, shortest distance paths, and global attention).

Transformer variants for modelling graphs were introduced shortly by direct generalization or more sophisticated compositions of ideas from Transformers and other neural message-passing architectures in general (Graph Neural Networks, GNNs). It soon became clear that, in order to obtain competitive performance in graph learning tasks, a Graph Transformer (GT) should strike a balanced view of two mutually exclusive aspects, namely both being graph-structure agnostic (as in the original Transformer) and still allow inclusion of structural information from the original graph structure (which is generally much richer than a node sequence). The key multi-head attention mechanism was preserved in all efforts and then graph-structure information was incorporated by compressing it into separate encodings, including GNN submodules for learning auxiliary graph representations or applying soft graph bias to attention scores.

A pertinent trait in a graph is whether its edges are directed or not. Directed graphs are natural representations of relations including social connections, human communications, paper citations, financial transactions, causes and effects, Web links, and the like. Within the realm of GNNs, directed graph models learning graph node and directed edge encodings have been successfully demonstrated to attain top performance for link prediction, node classification and graph-level tasks. On the other hand, current ground truth (GT) models primarily focus on integrating the graph structure into the Transformer, but do not prioritize on how to reflect the directionality of graph edges in their proposed architecture. In some cases, this is due to the fact that one of their key techniques is not applicable to directed graphs (Laplacian eigen-vectors) or edge-direction information are fixed scalars at input and local (in/out degrees) or a fixed scalar at input and pairwise (shortest path distances).

Challenges

Learning node representations that are explicitly aware of edge directionality (edge-direction-aware encodings) are generally unavailable with conventional transformers. Similarly, computing distinct global attention coefficient matrices for nodes serving as either sources or targets of directed connections (bidirectional global graph attention) is generally unavailable with conventional transformers. In example embodiments, transformer architectures are disclosed that learn node representations that are explicitly aware of edge directionality (edge-direction-aware encodings) and compute distinct global attention coefficient matrices for nodes serving as either sources or targets of directed connections (bidirectional global graph attention). In addition, example embodiments propagate edge-direction-aware node encodings to edge representation learning and integrate static graph information (degrees, shortest paths) and prior knowledge as node/edge features.

In an exemplary Directed Graph Transformer (DiGT) model approach, both edge direction (does node a point to node b or node b point to node a?) and graph structure (are nodes a, b connected?) are injected into a conventional transformer architecture as first-class citizens. Dual encodings for each graph node are computed, capturing its potential role as either a source or a target of a directed edge. Source and target encodings are learned by extending the multi-head node attention module, where edge attention channels are additionally introduced. Keeping to the interpretation of attention matrices as latent adjacency matrices, a node's source vector is updated by aggregating the target vectors of the neighbors it points to; similarly, a node's target vector update is the aggregation of the source vectors of those neighbors pointing to it. It is pertinent to note that both these latent neighborhoods (other ends of latent outgoing and incoming links, respectively) are dynamically learned and no prior local node information is necessary to include.

It is empirically demonstrated that embodiments of the disclosed DiGT model can have significant accuracy gains for the task of directed graph classification on synthetic and real graph datasets. Extensive benchmarks reveal that, when edge directionality is an inherent, rather than a derivative, characteristic of the instances to be classified, exemplary embodiments of DiGT consistently beat the best, state-of-the-art, directed-graph-accepting, GT and GNN alternatives in existence by a large margin.

Graph Neural Networks

Considering directed GNNs, a first conventional method approximates the digraph Laplacian by means of Personalized PageRank, and this relaxed definition offers performance benefits and the ability to process directed graphs that are not necessarily strongly connected.

A second conventional method combines first and second order proximity kernels for directed graphs to produce single-vector representations for graph nodes. Second order proximity kernels normalize the products of A and its transpose, and produce dual-vector intermediate representations.

Dual-vector representation can be enforced artificially: in one conventional technique, source/target graph autoencoder (GAE) and variational graph autoencoder (VGAE) models are based on graph auto-encoders for undirected graphs. The gravity-inspired directed GCN architecture, on the other hand, produces single vector encodings and embedding asymmetry in only one of the vector encoding entries as a function of the importance of the target node and the distance of the node encodings at the directed edge ends.

In one conventional technique, a spectral GCN for directed graphs based on the magnetic Laplacian was described. This Laplacian is a complex Hermitian matrix that symmetrizes the adjacency matrix in its magnitude and encodes the asymmetric directions in its phase. The magnetic Laplacian has the advantage of possessing real eigen-values and, consequently, it is directly compatible with the standard approximation analysis. Node encodings combine the real and the imaginary parts of unwinding the complex vectors that Magnet convolution produces.

In one conventional technique, two variants of Graph Transformer architecture are described. The simplest produces only node encodings, the other is augmented to also produce edge encodings. Node encodings follow a conventional transformer architecture path—multi-head attention matrix computation followed by a residual feed-forward neural network (FFN) module—while edge encodings update by scaling the attention matrix before a separate residual FFN is applied. The graph structure is induced by adding its Laplacian encoding to the node vector inputs (PE)—so is not applicable to directed graphs. Essentially, they introduce the pertinent idea of both node and edge channels; however, they enforce a strong inductive bias, since learned encodings consider only existing graph connection: they attend only to existing neighbors (local attention).

Embodiments of DiGT are not constrained in learning edge direction in (i) shortest path distances and (ii) degree encodings in the latter, both being indeed asymmetric for directed graphs. Embodiments of DiGT learn a pair of source and target encodings for each node. These could be linked to in/out degree encodings but they are fundamentally different: they do not need the knowledge of some fixed static input (i.e. the node degrees), they are not node-local (since their computation involves aggregating the right types of these vectors from incoming and outgoing links; they generalize sound and rich centrality ideas) and emphasize the duality in the roles of a node at an end of directed edge. These features reflect in significant performance gains in directed graph classification tasks against directed GNN and transformer approaches.

Preliminaries and Background

The dependencies of a network are generally described as a directed graph $G(V, E, w)$, i.e., a weighted dependency graph. Here V is the set of $n=|V|$ graph nodes and $E=\{(i, j)\in V\times V: i\mapsto j\}$ is the set of its $m=|E|$ directed edges, expressed as node pairs. Finally $w: V\times V\to\mathbb{R}$ is the edge weight function, with $w(i, j)$ being a scalar capturing the "strength" of the dependency $i\mapsto j$ iff $(i,j)\in E$—and vanishing otherwise. Following a linear algebra perspective, $G(V, E, w)$ is represented as an $n\times n$ sparse, weighted, adjacency matrix A. This matrix has m non-vanishing entries and its $(i, j)$ entry is set equal to the respective weight $w(i, j)$, i.e., A $[i, j]=w(i,j)$.

Source and Target Node Encodings for Directed Graphs

Consider a directed edge $i\mapsto j$, with weight $w(i, j)$, where i is the source node and j is the target node. Assume that node i is equipped with a pair of vectors in $\mathbb{R}^k$, $1\le i\le n$: (i) vector $s_i$ encodes i's role as a source, which is the same for any of the directed edges it participates as a source, and (ii) vector $t_i$ encodes i's role as a target; similarly for node j. The similarity of nodes i and j in building the weighted directed edge $i\mapsto j$ could then be captured by a similarity function $sim(\cdot,\cdot)$ which ideally evaluates to the true edge weight: $sim(s_i, t_j)=w(i,j)$. An immediate choice for the similarity function is the dot product: $sim(s_i, t_j)=s_i^T t_j$, with the encodings originally realized as column vectors.

Note that in an undirected graph, there can be no distinction on the roles of nodes i and j connected by an undirected edge $\{i, j\}$, alternatively $i\sim j$: both nodes are endpoints of an edge, rather than one specifically serving as its source and the other as its target. This means that only one encoding vector $x_i$ is needed per node i, rather than a pair $\{s_i, t_i\}$ of encoding vectors.

Directed GNNs: Message-Passing with Source and Target Node Encodings

A fundamental pattern for computing quantities defined over undirected graph nodes is message-passing where a node iteratively updates its value by sending it to its neighbors and then receiving and aggregating the values they send. As an example, if node i hosts a (vector) quantity $x_i$ and a simple summation operation is used for aggregation, then a single update for node i can be expressed as $x_i\leftarrow\Sigma_{j\sim i}x_j$ and alternatively:

$$x_i \leftarrow \sum_j A_{ij}x_j. \tag{1}$$

A single update for all nodes would then read:

$$X \leftarrow AX. \tag{2}$$

To generalize this message-passing scheme for directed graphs, consider a centrality algorithm that computes two scalar-valued scores for each node in a directed graph, its hub and authority scores. Thinking within the metaphor of nodes being Web pages connected with directed hyperlinks to each other, a node with high hub score (for example: a portal) is a good pointer to nodes with authoritative information-which in turn have elevated authority scores.

It is reasonable then to assume that a node with good hub score should point to nodes with good authority scores and conversely a high-authority node should be pointed to by high-hub nodes. From this intuition, it follows that high-hub nodes tend to be sources of directed links with their targets being high-authority nodes. This means that the hub score of node i is essentially a scalar version $s_i$, of source node encoding $s_i$ and the authority score of node i is essentially a scalar version $t_i$, of target node encoding $t_i$. The connection of the two scores can be expressed as $s_i\leftarrow\Sigma_{i\to j}t_j$ (i.e. good hubs point to good authorities) and $t_i\leftarrow\Sigma_{j\to i}s_j$ (i.e. good authorities are pointed to by good hubs). Returning to the disclosed source and target encoding vectors (rather than scalars), it can be analogously written:

$$s_i \leftarrow \sum_j A_{ij}t_j, \tag{3}$$

$$t_i \leftarrow \sum_j A_{ji}s_j.$$

Directed Graph Transformers

Graph Transformers (GT): Separate Attention Heads for Source and Target Encodings A simplified view of the module and an abstraction of its operation are initially considered.

The attention head in a transformer architecture generalizes the idea of expressing the encoding $x_i$ of any of each input node i, as a linear combination of the encodings of all $j=1, 2, \ldots, n$ nodes; the coefficients in this expression could then be as simple as encoding projections (dot products):

$$x_i \leftarrow \sum_j (x_i^T \cdot x_j)x_j. \tag{4}$$

The attention head in an actual transformer is allowed the flexibility to learn query, key and value weight matrices $(W_Q, W_K$ and $W_V)$ that transform the vectors in the right-hand side of Equation (4).

The vector projected $x_i\leftarrow W_Q^T x_i$, also referred to as the query vector $q_i$.

The vectors on which the query vector is projected: $x_j\leftarrow W_K^T x_i$, are also referred to as the key vectors $k_j$.

The vectors that are multiplied by the coefficients and added: $x_j\leftarrow W_V^T x_i$, are also referred to as the value vectors $v_j$.

This means that the attention head updates a node encoding:

$$x_i \leftarrow \sum_j \left(q_i^T \cdot k_j\right) v_j. \tag{5}$$

Assuming that all encodings live in $R^d$, the coefficients are typically normalized prior to constraining them in the [0, 1] range by softmax:

$$x_i \leftarrow \sum_j softmax\left(\frac{q_i^T \cdot k_j}{\sqrt{d}}\right) v_j. \tag{6}$$

Organizing the query, key and value vectors as rows in respective matrices $Q=XW_Q$, $K=XW_K$ and $V=XW_V$, the result can be written:

$$X = softmax(\overline{A})V, \tag{7}$$

where queries and key vectors define an attention matrix:

$$\overline{A} = \frac{Q \cdot K^T}{\sqrt{d}}, \tag{8}$$

$$X = softmax(\overline{A})V. \tag{9}$$

Revisiting Equation 4, which implicitly defines the entries of a new adjacency matrix A based on encoding projections and try to do similarly for the case where each node is equipped with both source and target encodings. As previously described, it is reasonable to assume that the weight $A_{ij}$ of the directed edge $i \mapsto j$ in this implicit adjacency matrix, can be set to the dot product $s_i^T t_j$, or $A=S \cdot T^T$. This means that Equation (3) will specifically read as:

$$s_i \leftarrow \sum_j \left(s_i^T t_j\right) t_j, \tag{10}$$

$$t_i \leftarrow \sum_j \left(t_i^T s_j\right) s_j,$$

and compactly as $$S \leftarrow \left(S \cdot T^T\right) T, \tag{11}$$

$$T \leftarrow \left(T \cdot S^T\right) S.$$

The flexibility of learning weight matrices can be similarly allowed for each of the expressions in Equation (11) so that a pair of attention head equations is obtained:

$$S \leftarrow softmax\left(\frac{Q_S \cdot K_T^T}{\sqrt{d}}\right) V_T, \tag{12}$$

$$T \leftarrow softmax\left(\frac{Q_T \cdot K_S^T}{\sqrt{d}}\right) V_S,$$

where the following matrices are set as $Q_S=SW_{QS}$, $K_T=TW_{KT}$ and $V_T=TW_{VT}$ in updating the source encodings S and $Q_T=TW_{QT}$, $K_S=SW_{KS}$ and $V_S=SW_{VS}$ in updating the target encodings T. Equation (12) defines a pair of attention matrices:

$$\overline{A}_{ST} = \frac{Q_S \cdot K_T^T}{\sqrt{d}}, \tag{13}$$

$$\overline{A}_{TS} = \frac{Q_T \cdot K_S^T}{\sqrt{d}}.$$

Input/Initial Layer Source and Target Node Embeddings

Given the n×n adjacency matrix A of the input (directed) graph G, consider its truncated Singular Value Decomposition (SVD), $A \sim U_r \Sigma_r V_r^T$, the r largest singular value triplets are kept, and set $$S_r = U_r \sum_r^{\frac{1}{2}} \text{ and } T_r = V_r \sum_r^{\frac{1}{2}}$$

for the source and target positional encodings. When input node features $X_f$ are available (set $X_f=0$ otherwise), the input/initial node embeddings for an embodiment of the DiGT model are given as:

$$S = L_s(S_r) + L_f(X_f) \tag{14}$$

$$T = L_t(T_r) + L_f(X_f)$$

where $L_s$, $L_t$ and $L_f$ are learnable linear transformations (subscripted as s for the sources, t for targets, and f for input features), and S, $T \in \mathbb{R}^{n \times d}$.

Edge-Augmented Graph Transformers (EGT): Edge Encodings are Functions of the Source and Target Node Encodings In one example, the attention head in transformer architecture as in Equation (9) is modified to include separate encodings $e_{ij}$, for all node pairs i,j=1, 2, . . . , n; for simplicity, assume that each node pair (edge) encoding lives in d dimensions, as the node encodings $x_i$'s: $e_{ij} \in R^d$, and all edge/encodings can be organized in a tensor $E \in R^{n \times n \times d}$.

Input/Initial Layer Dual Edge Embeddings

For encoding the edges, if input edge features $E_f$ are available (set $E_f=0$ otherwise) the input/initial edge embeddings for the DiGT model are given as:

$$E_{ST} = L_e\left([\delta_{st}]_{s,t=1,\dots,n}\right) + L_{ef}(E_f) \tag{15}$$

where $L_e$ is an embedding layer, $L_{ef}$ is a learnable linear transformation, and $\delta_{st}$ is the shortest directed path distance from source s to target t, clipped at maximum k-hops (if t is not reachable from s, set $\delta_{st}=k+1$). The result, $E_{ST} \in \mathbb{R}^{n \times n \times d}$, is the matrix of d dimensional edge embeddings, and $E_{TS}$ is set as the transpose of $E_{ST}$ along the first two dimensions.

Edge Bias and Neighborhood Attention

The edge channels are allowed to directly influence the attention by introducing a per head bias matrix, $B_{ST} \in \mathbb{R}^{n \times n}$, and a gate matrix, $G_{ST} \in \mathbb{R}^{n \times n}$, both of which are linear transformations from the edge encodings $E_{ST}$ (with added layer norms). Further, $B_{TS}$ and $G_{TS}$ are their transpose matrices, respectively.

The attention from node channels is localized to the k-hop neighborhood around each node. This is implemented by masking the attention matrix along with the edge bias via an element-wise product with the binary k-hop matrix $D^{(k)}$ which is defined by setting $D_{i,j}^{(k)} = 1$ iff $\delta_{ij} \le k$ for the shortest path distance from node i to node j, and zero otherwise. Thus, the attention matrices, denoted $\tilde{A}$, for this layer are given as:

$$\tilde{A}_{ST} = \left(\overline{A}_{ST} + B_{ST}\right) \odot D_{ST}^{(k)} \qquad (16)$$

$$\tilde{A}_{TS} = \left(\overline{A}_{TS} + B_{TS}\right) \odot D_{TS}^{(k)}$$

This way, the attention is controlled to be within the k-hop neighbors around the nodes.

Directional Attention

Finally, unlike traditional transformers that compute node importance via a softmax along each row of the attention matrix, both $\tilde{A}_{ST}$ and $\tilde{A}_{TS}$ are stacked and the softmax is computed along the stacking direction (FIG. 1B, discussed below, visualizes this mechanism), given as $$\tilde{A}_{ST}, \tilde{A}_{TS} = \mathit{softmax}\left(\tilde{A}_{ST}, \tilde{A}_{TS}\right). \qquad (17)$$

By doing so, the importance of directionality for the attention/adjacency information is weighed.

Lastly, the flow of information between nodes is enabled by gating their value representations prior to aggregation; this is realized as multiplication by the sigmoid function, $\sigma(\ )$, of the entries in gate matrices, $G_{ST}$ and $G_{TS}$, resulting in:

$$V = \left(\left(\tilde{A}_{ST} \odot \sigma(G_{ST})\right)V_T\right) + \left(\left(\tilde{A}_{TS} \odot \sigma(G_{TS})\right)V_S\right) \qquad (18)$$

where $V \in \mathbb{R}^{n \times d_p}$ is the value representation for one head. So, when there are $h = d/d_p$ heads, all of them are concatenated (and layer norm is added) to obtain the final value representation $V \in \mathbb{R}^{n \times d}$, for the next step. Also, in example embodiments, the different DiGT layers do not share edge embeddings (this is also true for bias and gate matrices).

Output Layers and Prediction

One point to note is that, in embodiments, after each DiGT layer, the combined value encoding V is taken, and layer normalization and feed-forward network modules with residual connections are used to produce the node and edge encoding outputs for a DiGT layer. These outputs become inputs for the next layer. Thus, the updated dual encodings S, T for the next layer are given as:

$$S = f(L_{VS}(V)) \qquad (19)$$

$$T = f(L_{VT}(V))$$

where $L_{VS}$ and $L_{VT}$ are two linear transformations followed by a non-linear activation f (with layer norms and residual connections). To obtain the updated edge embeddings $E_{ST} \in \mathbb{R}^{n \times n \times d}$ for the next layer, $\overline{A}_{ST}$ and $B_{ST}$ from all heads are added together, and a learnable linear transformation and non-linearity are applied, as follows: $E_{ST} = f(L_E(\overline{A}_{ST} + B_{ST}))$.

Lastly, to obtain the final output node embeddings, both the source and target embeddings are concatenated, as follows: $X = concat(S, T)$.

After the last DiGT layer is processed, the encodings X are driven through some final learning task-specific modules. These are typically multilayer perceptron layers (MLP) for tasks related to node and edge learning (node classification, link prediction), or pooling layers for graph-level learning (graph classification, graph regression).

For the directed graph classification task, global average pooling is used in an example embodiment for producing a representation/encoding of the whole graph; this is essentially the average of the final node encodings.

Figure 1B:
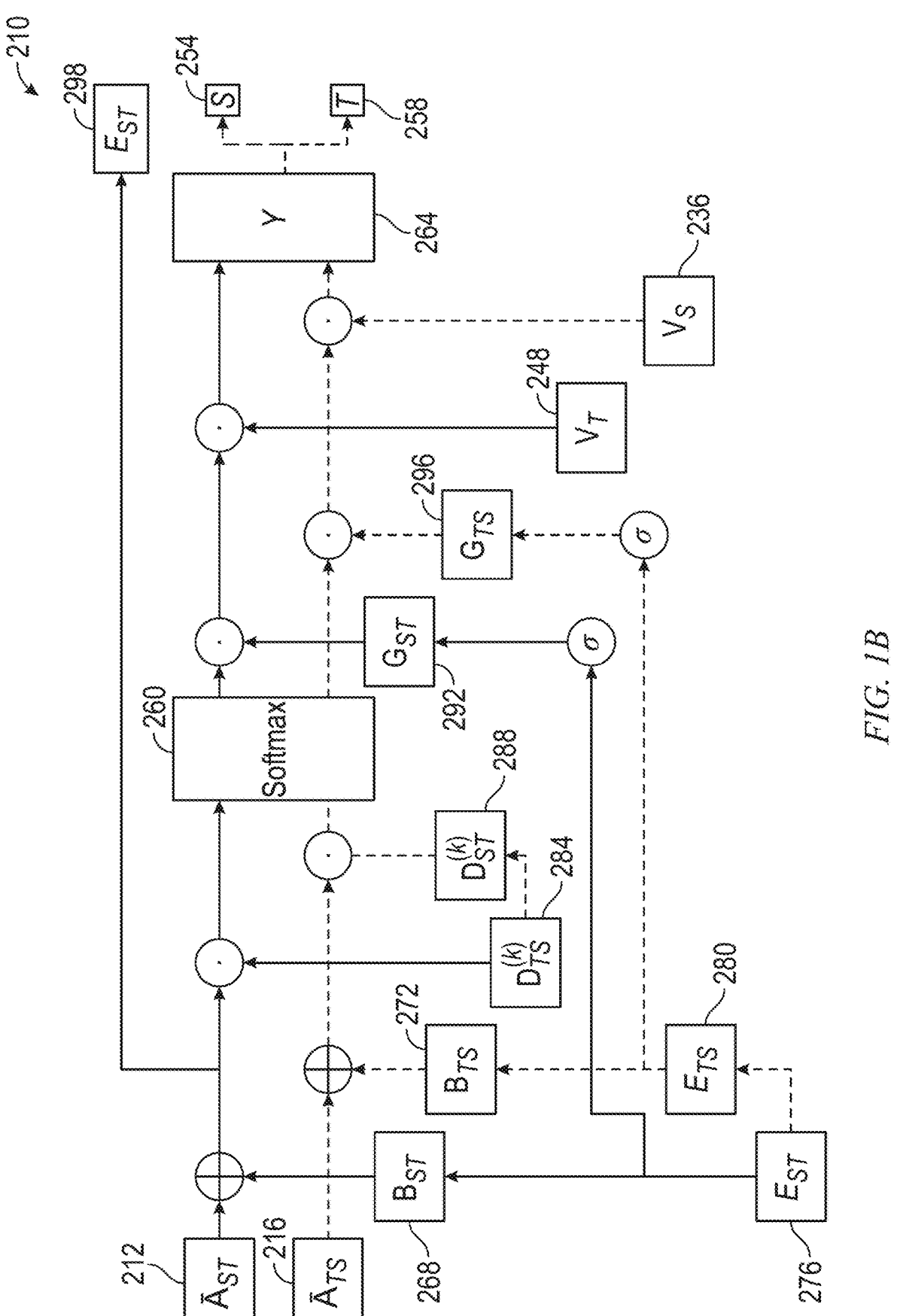

FIGS. 1A and 1B are a high-level block diagram of a directed graph transformer 210, in accordance with an example embodiment. In one example embodiment, the directed graph transformer 210 corresponds to one layer of a machine learning system. As described more fully above in conjunction with equations 1-19, source embedding 252 and target embedding 256 are input to the directed graph transformer 210. Matrices $Q_S$ 228, $K_S$ 232, and $V_S$ 236 are learned from the source embedding 252 in a known manner and matrices $Q_T$ 240, $K_T$ 244, and $V_T$ 248 are learned from the target embedding 256 in a known manner. Matrices $Q_S$ 228 and $K_T$ 244 are projected and scaled by process 220 to generate an attention matrix $\overline{A}_{ST}$ 212. Similarly, matrices $Q_T$ 240 and $K_S$ 232 are projected and scaled by process 224 to generate an attention matrix $\overline{A}_{TS}$ 216. In a non-limiting example, processes 220 and 224 are implemented in software using known matrix projection and scaling techniques. Note that project and scale processes 220, 224 use well known techniques and can be implemented, for example, in software.

Turning to FIG. 1B, edge embeddings $E_{ST}$ 276 and $E_{TS}$ 280 are learned in a known manner and are used to learn biases $B_{ST}$ 268 and $B_{TS}$ 272. The biases $B_{ST}$ 268 and $B_{TS}$ 272 are then summed with the attention matrix $\overline{A}_{ST}$ 212 and the attention matrix $\overline{A}_{TS}$ 216, respectively. A first source Hadamard product is computed based on a learned localization vector $D_{TS}^{(k)}$ 284 and the results of the summation with the attention matrix $\overline{A}_{ST}$ 212. Similarly, a first target Hadamard product is computed based on a learned localization vector Der 288 and the results of the summation with the attention matrix $\overline{A}_{TS}$ 216. A softmax operation 260 is performed on each of the first source Hadamard product and the first target Hadamard product.

The edge embeddings $E_{ST}$ 276 and $E_{TS}$ 280 are also each weighted by a weighting factor $\sigma$ and the weighted edge embeddings $E_{ST}$ 276 and $E_{TS}$ 280 are used to learn gates $G_{ST}$ 292 and $G_{TS}$ 296. A second source Hadamard product is computed based on the results of the source softmax operation and the learned gate $G_{ST}$ 292. Similarly, a second target Hadamard product is computed based on the results of the target softmax operation and the learned gate $G_{TS}$ 296. Elements 284, 288 are matrices that contain binary values (zeroes or ones) based on the shortest path distance between graph nodes and a value k. More specifically, such a binary k-hop matrix $D^{(k)}$ is defined by setting $D_{i,j}^{(k)} = 1$ iff $\delta_{ij} \le k$ for the shortest path distance from node i to node j, and zero otherwise (i.e., $D_{i,j}^{(k)}$ is the entry at row i and column j in this matrix). Elements $V_T$ 248 and Vs 236 are, respectively, $V_T$ and $V_S$, which are value representations, which are obtained by multiplying target and source encodings (respectively T and S) by learnable matrices (respectively $W_{VT}$ and $W_{VS}$): $V_T$=T $W_{VT}$ and $V_S$=S $W_{VS}$. The products that $V_T$ and $V_S$ are involved in (immediately prior to entering the Y function block) are matrix multiplications which gate their values, as per Equation (18) mentioned previously. The Y function block: (1) aggregates (adds) the two terms (as in the previous equation) and (2) implements Equations (19) also mentioned previously. These equations include linear transformations followed by a non-linear activation f (with layer norms and residual connections). The discussion around Equation (19) is applicable for this. Moreover, as described above, to determine the updated edge embeddings $E_{ST}$ 298, where $E_{ST} \in \mathbb{R}^{n \times n \times d}$ is for the next layer, $\overline{A}_{ST}$ and $B_{ST}$ from all heads are added together, and a learnable linear transformation and non-linearity are applied, as follows: $E_{ST}$=f($L_E$($\overline{A}_{ST}$+$B_{ST}$)). It is worth noting that, in one or more embodiments, $E_{ST}$ 276 is thus the "input" $E_{ST}$ in another of the layers (for example, for the first layer this is given by Equation (15)). $E_{ST}$ 298 in the upper right-hand corner of FIG. 1B, however, is the "output" $E_{ST}$ from one layer (and the input to the next layer)—as given by the equation above: $E_{ST}$=f($L_E$($\overline{A}_{ST}$+$B_{ST}$)).

It is also worth noting that, in one or more embodiments, the same architecture is used for the two stages:

(1) learning the model (training time); and (2) applying/using the learned model on a new directed graph sample (at inference/test time).

A pertinent difference is that in (1) there is also a back-propagation step through this same architecture (as in equation (2)) to learn the model (i.e. basically learn the weight matrices (the W's)). Having learned the model, the learned W's can be used to compute the key, query, value matrices (K's, Q's, V's) based on the input S and T, as in the softmax equations defining S and T above. In other words, there are entities that are learned (during stage (1) (such as W's)), entities that are input (such as S and T, as in equation (14) at the first layer) and entities that are computed (such as matrices K's, Q's, and V's).

Experiments

Tasks and Datasets

Directed Graph Classification

In the literature, numerous graph datasets for graph-level tasks, such as classification and regression, have been used; these can be synthetic or span diverse application domains from small molecules to bioinformatics, computer vision and social networks. However, all these datasets are undirected, so they are not suitable as inputs for the present directed graph classification task.

Conventional Datasets

As an interesting exception, one conventional technique used a conventional database of handwritten digits and a conventional database of images as collections of directed graph inputs for their directed graph classification task. These are actually derived graph datasets: originally, collections of images (respectively of handwritten digits and objects) and not graphs. In one conventional technique, an image is converted to a directed graph by first segmenting the original image pixels into sets of (coarser-grained) super linear iterative clustering (SLIC) superpixels. Directionality in the edges follows from the fact that a superpixel i that has fewer neighboring superpixels than what one of its neighbors j has, will tend to connect to j rather than the other way around (i.e. $i \mapsto j$ will have more weight than $j \mapsto i$). It follows that the graph nodes and the edge directions extracted between them are not intrinsic to the original image datasets.

FlowGraph Family of Datasets

A family of directed graph datasets are disclosed that explicitly relate the edge direction pattern in graphs to their classification labels; we refer to same as the "FlowGraph family of datasets." In particular, graphs are generated with their nodes organized in successive layers and then the notion of flow between the layers through directed edges is leveraged: graphs are labeled differently with different aggregate flow and average flow direction, between pairs of layers and within sets of layers (subgraphs), respectively. N graph nodes are organized into K clusters and cluster adjacencies are defined in a meta-graph adjacency matrix F, with its entries $F_{kl}$ marking the allowance of directed edges from nodes in cluster k to those of cluster l. More specifically, it is assumed that the node clusters are arranged sequentially, l=0, 1, . . . , K−1 (for example, from left to right) and a subset of its first $l_s$<K consecutive clusters define a subgraph S. In FlowGraph, directed edges between nodes belonging to all node clusters with a probability being a small noise parameter η by default (typically η=0.01) are allowed. Then, for directed edges between nodes in successive clusters, with the source node/being in a cluster in subgraph S, $F_{l,l+1}$ is set to a percentage f %. This percentage is different for different classes and depends on their number $n_c$. In the disclosed experiments, for all generated graphs N=150, K=10, $l_s$=4. Three graph datasets are generated: one dataset for each of the $n_c$=2, 3, 6-class cases.

Figure 2:
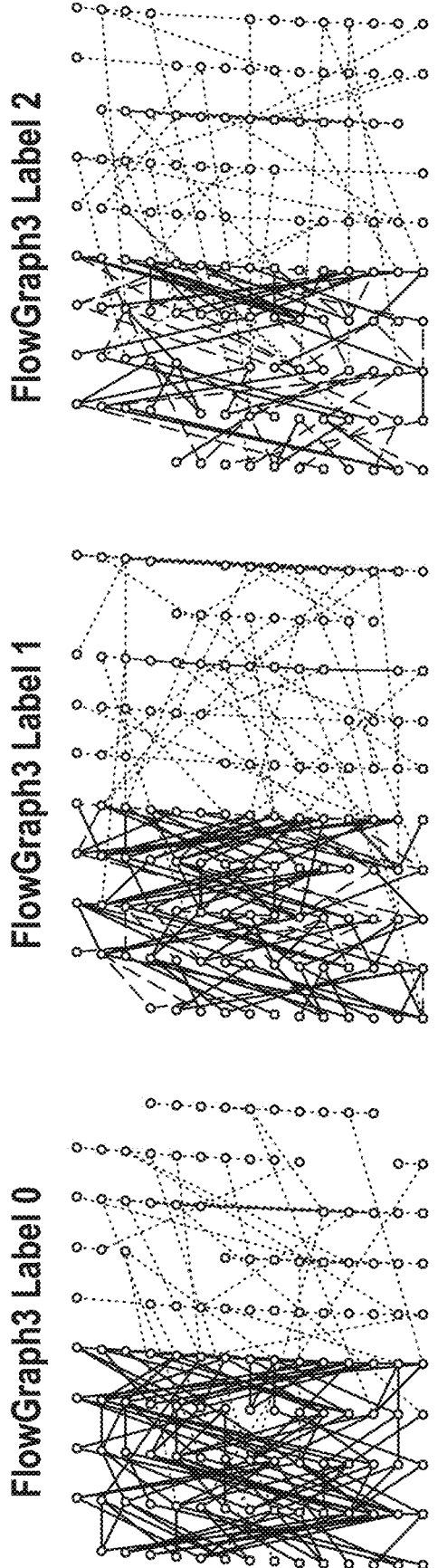
FIG. 2 is a visual representation of the flowgraph datasets, in accordance with an example embodiment.

FIG. 2 is visual representation of the flowgraph datasets, in accordance with an example embodiment.

Referring to FIG. 2, as per the legend, note the edges that are the flows from left to right, the edges that are the flows from right to left, and the edges that are noises. In all three samples, half of the edges are noises. In the left sample, besides the noise edges, almost all the edges have the flow from left to right; in the middle sample, 75% of the edges have the flow from left to right; whereas in the right sample, 50% of the edges have the flow from left to right.

We have accordingly introduced a family of directed graph datasets that explicitly relate the edge direction pattern in graphs to their classification labels. In particular, we generate graphs with their nodes organized in successive layers and then we leverage the notion of a flow between the layers through directed edges: for a predefined subset of layers, graphs with different aggregate flow between successive layers in the subset, are assigned different labels. We organize N graph nodes into K clusters and define cluster adjacencies in a meta-graph adjacency matrix F, with its entries $F_{kl}$ marking the allowance of directed edges from nodes in cluster k to those of cluster l. More specifically, we assume that the node clusters are arranged sequentially, l=0, 1, . . . , K−1 (say from left to right) and a subset of its first $l_s$<K consecutive clusters define a subgraph S. In embodiments of FlowGraph we allow directed edges between nodes belonging to all clusters with the probability being a small noise parameter η (typically η=0.01). Then for directed edges between nodes in successive clusters, with the source node l being in a cluster in subgraph S, we set $F_{l,l+1}$ to a percentage f %. These percentages are different for different classes and depend on the number of classes $n_c$. In our experiments, for all generated graphs we set N=150, K=10, $l_s$=4. We generate 3 graph datasets: one dataset for each of the $n_c$=2, 3, 6-class cases. We depict three graph instances from each of the 3 classes of FlowGraph3 (as discussed above).

Social Network Subgraph datasets

In example experiments, 973 directed ego-networks from conventional social network subgraphs are used, each corresponding to some user u (ego): the ego-network is between u's friends (also referred to as alters). If nodes $v_i$, $v_j$ are in u's ego-network, then u follows them and, if $v_i$ follows $v_j$, then there is a directed edge $v_i \mapsto v_j$ in the ego-network. Perturbations are introduced to each of these real ego-networks where a perturbation can be either (i) rewiring of an existing edge (an (a, b)∈E(ego(u)) is deleted and replaced by an edge (c, d) where nodes c, d are randomly selected from V(ego(u))) or (ii) reversing of the direction of an existing edge (a, b)∈E(ego(u)): it is replaced by (b, a). The percentage of the perturbed edges in an ego-network can be [0, 25, 50, 75, 100] %. Rewiring of reversing its direction is decided with equal probabilities. So for each of the percentages, 973 new perturbed ego-networks are generated, each labeled with the perturbation percentage. The collection of the 5×973 perturbed dataset (5 labels/classes) derived from conventional social network subgraphs are referred to and, if 3×973 of them correspond to perturbation percentages [0%, 50%, 100%], then the dataset (3 labels/classes) derived from the conventional social network subgraphs is obtained.

Evaluation Setup

Results from the literature were reused for a conventional model operating on the conventional database of handwritten digits and the conventional database of images. For all experiments, the batch size was fixed to 32, run for a maximum of 200 epochs and the number of learnable parameters was kept in the 100K to 200K range. The validation accuracy was calculated and the best performing instance was checkpointed. After all the epochs are run, the checkpoint was loaded and the model was evaluated on the test accuracy. Early stopping is performed if the model's validation accuracy does not increase for 10 consecutive epochs.

Grid search is employed for tuning the learning rate $\eta \in \{2^i \times u | i=0, 1, 2, 3, 4\}$ with u=5×10$^{-4}$, choosing $\eta$=5×10$^{-4}$ for EGT and exemplary DiGT models on the conventional database of handwritten digits and the conventional database of images, and $\eta$=8×10$^{-3}$ for all other datasets. The same process was repeated for GNN models, based on a conventional directed framework, therefore $\eta$=10$^{-4}$ was adopted.

We used Python; a known machine learning framework; and a Python library for deep learning on irregular structures, such as graphs, point clouds, and manifolds, which is a geometric deep learning extension library.

Results

The GNN and GT models were trained over conventional datasets of flowgraphs, tweets and SuperPixels, and their directed graph classification accuracies were evaluated for numbers of classes, $n_c \in \{2, 3, 6, 10\}$; the table of FIG. 3A lists the results. It was observed that, for flowgraph datasets, an exemplary embodiment of DiGT outperforms the second best EGT models by a large margin, ranging from 1% (for binary classification) to 4% (for 3 classes) on average. For the dataset derived from the conventional social network subgraphs, as perturbed by random rewirings and edge reversals, it was similarly demonstrated that DiGT has superior performance to EGT with significant 3.2% and 3.6% accuracy differences. For the conventional database of handwritten digits and the conventional database of images, which, however, are not intrinsically directed by construction, DiGT is very competitive to EGT (less than 1.5% and 0.3% accuracy performance gap). The GNN models underperform in the directed graph classification task and the differences can be dramatic in the featureless datasets (flowgraphs and the conventional social network subgraphs), exceeding 50% accuracy gap with best performing DiGT for the conventional social network subgraphs (however the conventional directed GNN used was consistently better than GCN, the undirected model). It is apparent that the choice of unit initialization for GNNs on featureless datasets drastically hurts their performance. For the conventional database of handwritten digits and the conventional database of images, the relevant (node) features are given and then the performance difference is mitigated.

Ablation Study

The effect of localizing the attention from node channels was studied by masking the clipped attention matrix via its Kronecker product with the adjacency matrix A. This translates to replacing the terms $(\overline{A}_{ST})$ and $(\overline{A}_{TS})$ in Equations (16) by $(\overline{A}_{ST}) \odot A$ and $(\overline{A}_{TS}) \lfloor A$. The effect of localizing the attention from edge channels was similarly studied by masking in Equations (16) (i) the bias matrices $B_T$, $B_S$ as $B_T \odot A$, $B_S \odot A$ and (ii) the gating matrices $G_T$, $G_S$ as $G_T \odot A$, $G_S \odot A$. Classification accuracy results are reported in the table of FIG. 3B. It is noted that, in the case of the dataset with 5 labels/classes derived from the conventional social network subgraphs, limiting both "node" and "edge" attention to local graph structure only, effectively hindering direct interaction of nodes not connected in the original graph, is beneficial for classification accuracy, boosting it by approximately 7%: an ego-network is densely organized around a node so direct, multi-hop interactions are not reasonably critical. On the other hand, for FlowGraph with 3 labels/classes, localizing "node" attention has a small effect (2% improvement), but when "edge" channels are localized, the accuracy drop is severe, by >30%. Flowgraphs are built around the notion of flows starting from nodes on the left to nodes on the right, traversing 10 layers (hops) end-to-end in experiments using example embodiments, so direct multi-hop virtual edges should be important to capture flow paths in the classification. Then, blocking such connections by localizing "edges" (as done here) is expected to have significant effect as empirically demonstrated.

Initialization Effect

The effect of different initialization strategies for node and edge embeddings, S$^{(0)}$, T$^{(0)}$ and E$^{(0)}$, were studied and the findings were summarized in the table of FIG. 3C. In particular, the cases (i) node embeddings S$^{(0)}$ and T$^{(0)}$ are initialized with random vectors, but E$^{(0)}$ follows the standard initialization strategy, (ii) edge embeddings E$^{(0)}$ are initialized with random vectors, but S$^{(0)}$ and T$^{(0)}$ follow the standard initialization strategy and (iii) the default way is used to initialize edge embeddings E$^{(0)}$ and one type of node embeddings, for example source encodings S$^{(0)}$ are considered; then the other type of node embeddings are set to identical values T$^{(0)}$:=S$^{(0)}$. It is interesting to note that, when source and target encodings are initialized to the same values, the EGT model that processes only one type of node embeddings is approximated. On the other hand, edge encodings in an example of full DiGT, for featureless datasets like flowgraphs and the conventional social network subgraphs, embed five scalars (in/out degrees of edge endpoints and distance) rather than one scalar in EGT (distance) and it would be expected to render better results, assuming only one type of encoding. This is indeed the case. In FlowGraph with 3 labels/classes, DiGT attains higher accuracy than DiGT with single type embedding almost by 2%, and this in turn outperforms EGT by another 2%. The pattern is similar for the dataset with 5 labels/classes derived from the conventional social network subgraphs (approximately 2% accuracy differences). Then the first performance increment could be potentially attributed to the novel, dual encoding architecture utilized in example embodiments while the latter to the richer edge encoding that DiGT also adopts—compared to EGT. A notable accuracy degradation is also observed when the edge encodings in FlowGraph with 3 labels/classes are randomly initialized: as remarked previously, a flowgraph emphasizes the notion of paths of directed flows. Then it follows that the direct representation of multihop edge connections should be subtle and educated, so randomly assigning to these representations does not serve this purpose.

Techniques as disclosed herein can provide substantial beneficial technical effects. Some embodiments may not have these potential advantages and these potential advantages are not necessarily required of all embodiments. By way of example only and without limitation, one or more embodiments may provide one or more of:

improves the technological process of machine learning with a graph transformer architecture and techniques that explicitly takes into account graph directionality;

demonstrated accuracy gains over state-of-the-art graph transformer approaches;

techniques for characterizing code representations, characterizing causal directed graphs, and characterizing social subgraphs (characterizing groups of people connected in a social network);

dual embeddings that enable latent connections between nodes not in the original graph and increase the performance of characterizing a connected graph; and direction-aware encodings for nodes in Graph Transformers.

Given the discussion thus far, it will be appreciated that, in general terms, an exemplary method, according to an aspect of the invention, includes the operations of obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer:

based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification task with respect to the obtained directed graph based on the generated source encodings and the generated target encodings.

In one example embodiment, the source query matrix comprises rows of source query vectors and the source key matrix comprises rows of source key vectors.

In one example embodiment, the target query matrix comprises rows of target query vectors and the target key matrix comprises rows of target key vectors.

In one example embodiment, the transformer further, based on the directed graph, computes a source value matrix and a target value matrix, wherein the source value matrix comprises rows of source value vectors, and wherein the target value matrix comprises rows of target value vectors.

In one example embodiment, the source query matrix is defined as $Q_S = SW_{QS}$, the source key matrix is defined as $K_S = SW_{KS}$, the source value matrix is defined as $V_S = SW_{VS}$, the target query matrix is defined as $Q_T = TW_{QT}$, the target key matrix is defined as $K_T = TW_{KT}$, and the target value matrix is defined as $V_T = TW_{VT}$, and where:

$$S \leftarrow \mathit{soft}\max\left(\frac{Q_S \cdot K_T^T}{\sqrt{d}}\right)V_T,$$

$$T \leftarrow \mathit{soft}\max\left(\frac{Q_T \cdot K_S^T}{\sqrt{d}}\right)V_S,$$

$W_{QS}$ comprises source query weight matrix, $W_{KS}$ comprises source key weight matrix, $W_{VS}$ comprises source value weight matrix, $W_{QT}$ comprises target query weight matrix, $W_{KT}$ comprises target key weight matrix, and $W_{VT}$ comprises target value weight matrix.

In one example embodiment, the source-target attention matrix and the target-source attention matrix are based on:

$$\bar{A}_{ST} = \frac{Q_S \cdot K_T^T}{\sqrt{d}},$$

$$\bar{A}_{TS} = \frac{Q_T \cdot K_S^T}{\sqrt{d}}.$$

where d is a dimension of the source-target vector-edge encoding and the target-source vector edge encoding.

In one example embodiment, each initial source encoding and each initial target encoding are based on:

$$\tilde{A}_{ST} = \left(\bar{A}_{ST} + B_{ST}\right) \odot D_{ST}^{(k)} \quad \tilde{A}_{TS} = \left(\bar{A}_{TS} + B_{TS}\right) \odot D_{TS}^{(k)}$$

where $B_{ST}$ is a source-target bias, $B_{TS}$ is a target-source bias, $D_{ST}^{(k)}$ is a source-target binary k-hop matrix and $D_{TS}^{(k)}$ is a target-source binary k-hop matrix.

In one example embodiment, each initial source encoding, designated as S, and each initial target encoding, designated as T, are revised, wherein S and T are defined by $$S = f(L_{VS}(V)) \quad T = f(L_{VT}(V))$$

where $L_{VS}$ and $L_{VT}$ are two linear transformations and f is a non-linear activation with layer norms and residual connections, and wherein V is based on a multiplication by a sigmoid function, $\sigma(\ )$, of entries in gate matrices, $G_{ST}$ and $G_{TS}$, where V is defined by:

$$V = \left( \left( \bar{A}_{ST} \odot \sigma(G_{ST}) \right) V_T \right) + \left( \left( \bar{A}_{TS} \odot \sigma(G_{TS}) \right) V_S \right).$$

In one example embodiment, bidirectional relations of the directed graph are learned using recursion.

In one example embodiment, bidirectional affinities between all pairs of nodes are learned via nonlinear transforms of the corresponding source encoding S and target encoding T.

In one example embodiment, the classification comprises identification of malicious software based on directed function call graphs.

In one aspect, a computer program product comprises one or more tangible computer-readable storage media and program instructions stored on at least one of the one or more tangible computer-readable storage media, the program instructions executable by a processor, the program instructions comprising obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer:

based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification task with respect to the obtained directed graph based on the generated source encodings and the generated target encodings.

In one aspect, an apparatus comprises a memory and at least one processor, coupled to the memory, and operative to perform operations comprising obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target; inputting the directed graph into the transformer, wherein the transformer:

based on the directed graph, computes a source query matrix, a source key matrix, a target query matrix, and a target key matrix; projects and scales the source query matrix and the target key matrix to create a source-target attention matrix and the target query matrix and the source key matrix to create a target-source attention matrix; combines the source-target attention matrix and the target-source attention matrix to generate a source-target vector-edge encoding and a target-source vector-edge encoding; modifies the source-target attention matrix and the target-source attention matrix via biasing and gating; generates source encodings and target encodings using the modified source-target attention matrix and the modified target-source attention matrix; and performs a classification task with respect to the obtained directed graph based on the generated source encodings and the generated target encodings.

In one aspect, an exemplary method, according to an aspect of the invention, includes the operations of obtaining a directed graph comprising a plurality of nodes and at least one directed edge with weight, the at least one directed edge connecting two nodes of the plurality of nodes, wherein each node of the directed graph comprises a first pair of vectors, where a source vector 252 of the first pair of vectors encodes a role of the node as a source and a target vector 256 of the first pair of vectors encodes the role of the node as a target; learning, using at least one hardware processor, a source query matrix 228, a source key matrix 232 and a source value matrix 236, where the source query matrix 228 comprises rows of source query vectors, the source key matrix 232 comprises rows of source key vectors and the source value matrix 236 comprises rows of source value vectors; learning, using the at least one hardware processor, a target query matrix 240, a target key matrix 244 and a target value matrix 248, where the target query matrix 240 comprises rows of target query vectors, the target key matrix 244 comprises rows of target key vectors and the target value matrix 248 comprises rows of target value vectors; projecting and scaling, using the at least one hardware processor, the source query matrix 228 and the target key matrix 244 to create a source-target attention matrix 212 and projecting and scaling the target query matrix 240 and the source key matrix 232 to create a target-source attention matrix 216; combining, using the at least one hardware processor, the source-target attention matrix 212 and the target-source attention matrix 216 to generate a source-target vector-edge encoding 276 and a target-source vector-edge encoding 280; biasing and gating, using the at least one hardware processor, the source-target attention matrix 212 and the target-source attention matrix 216 to generate a modified source-target attention matrix and a modified target-source attention matrix, respectively; generating, using the at least one hardware processor, a plurality of source encodings 254 and a plurality of target encodings 258 using the modified source-target attention matrix and the modified target-source attention matrix; configuring a transformer based on the directed graph, and the source encodings 254 and target encoding 258; and performing classification using the configured transformer.

In one example embodiment, the source query matrix is defined as $Q_S = SW_{QS}$, the source key matrix is defined as $K_S = SW_{KS}$, the source value matrix is defined as $V_S = SW_{VS}$, the target query matrix is defined as $Q_T = TW_{QT}$, the target key matrix is defined as $K_T = TW_{KT}$, and the target value matrix is defined as $V_T = TW_{VT}$.

$$S \leftarrow softmax\left( \frac{Q_S \cdot K_T^T}{\sqrt{d}} \right) V_T,$$

$$T \leftarrow softmax\left( \frac{Q_T \cdot K_S^T}{\sqrt{d}} \right) V_S,$$

Furthermore, $W_{QS}$ comprises source query weight matrix, $W_{KS}$ comprises source key weight matrix, $W_{VS}$ comprises source value weight matrix, $W_{QT}$ comprises target query weight matrix, $W_{KT}$ comprises target key weight matrix, and $W_{VT}$ comprises target value weight matrix.

It is worth noting as an aside that Equations (7) and (9) are what prior works on (undirected) Graph Transformers typically do: they have one kind of node encodings (X), one kind of attention matrix ($\overline{A}$) and one kind of value encodings for the nodes (V). Similarly, equation (8) is pertinent to prior works on (undirected) Graph Transformers. In the case of Directed Graph Transformers according to aspects of the invention, we have basically two for each of the above: S and T (instead of X), $V_S$ and $V_T$, (instead of V), $\overline{A}_{ST}$, $\overline{A}_{TS}$ (instead of $\overline{A}$). Based on those, to compute updates for source and target encodings (S and T) we can take one of two "routes": either A (Equation 12) or B (Combined Equations (16-19)) for computing the updates to S, T.

In one or more embodiments, the source-target attention matrix and the target-source attention matrix are based on:

$$\overline{A}_{ST} = \frac{Q_S \cdot K_T^T}{\sqrt{d}},$$

$$\overline{A}_{TS} = \frac{Q_T \cdot K_S^T}{\sqrt{d}}.$$

In the above, d is a dimension of the source-target vector-edge encoding and the target-source vector edge encoding.

In one or more embodiments, each initial source encoding and each initial target encoding are based on:

$$\tilde{A}_{ST} = \left(\overline{A}_{ST} + B_{ST}\right) \odot D_{ST}^{(k)} \quad \tilde{A}_{TS} = \left(\overline{A}_{TS} + B_{TS}\right) \odot D_{TS}^{(k)}$$

where $B_{ST}$ is a source-target bias, $B_{TS}$ is a target-source bias, $D_{ST}^{(k)}$ is a source-target binary k-hop matrix and $D_{TS}^{(k)}$ is a target-source binary k-hop matrix.

One or more embodiments further include revising each initial source encoding, designated as S, and each initial target encoding, designated as T, and wherein S and T are defined by $$S=f(L_{VS}(V))T=f(L_{VT}(V))$$

where $L_{VS}$ and $L_{VT}$ are two linear transformations and f is a non-linear activation with layer norms and residual connections, and wherein Vis based on a multiplication by a sigmoid function, $\sigma(\ )$ of entries in gate matrices, $G_{ST}$ and $G_{TS}$, where V is defined by:

$$V = \left(\left(\tilde{A}_{ST} \odot \sigma(G_{ST})\right)V_T\right) + \left(\left(\tilde{A}_{TS} \odot \sigma(G_{TS})\right)V_S\right).$$

In one example embodiment, bidirectional relations of the directed graph are learned using recursion.

In one example embodiment, the source encoding and the target encoding for each node captures a corresponding role as either the source or the target of the corresponding directed edge based on a complete digraph topology.

In one example embodiment, each source encoding and each target encoding is computed as a learnable linear combination of corresponding target and source encodings with coefficients being bidirectional node affinities.

In one example embodiment, bidirectional affinities between all pairs of nodes are learned via nonlinear transforms of the corresponding source encoding S and target encoding T.

In one example embodiment, the classification comprises identification of malicious software based on directed function call graphs. Mitigation of the malicious software can then be carried out or otherwise facilitated. For example, in FIG. 4, send signals over WAN 102 to adjust a router, firewall, access control list, or the like to block malicious traffic. A network can then be operated with the malicious software having been mitigated. There are many other applications, such as characterizing groups of people connected in a social network; characterization of financial transactions based on their direction; characterization of hyperlink and citation substructures; identification of inherently directed communication networks; and the like.

In one aspect, a computer program product comprises one or more tangible computer-readable storage media and program instructions stored on at least one of the one or more tangible computer-readable storage media, the program instructions executable by a processor, the program instructions comprising obtaining a directed graph comprising a plurality of nodes and at least one directed edge with weight, the at least one directed edge connecting two nodes of the plurality of nodes, wherein each node of the directed graph comprises a first pair of vectors, where a source vector 252 of the first pair of vectors encodes a role of the node as a source and a target vector 256 of the first pair of vectors encodes the role of the node as a target; learning a source query matrix 228, a source key matrix 232 and a source value matrix 236, where the source query matrix 228 comprises rows of source query vectors, the source key matrix 232 comprises rows of source key vectors and the source value matrix 236 comprises rows of source value vectors; learning a target query matrix 240, a target key matrix 244 and a target value matrix 248, where the target query matrix 240 comprises rows of target query vectors, the target key matrix 244 comprises rows of target key vectors and the target value matrix 248 comprises rows of target value vectors; projecting and scaling the source query matrix 228 and the target key matrix 244 to create a source-target attention matrix 212 and projecting and scaling the target query matrix 240 and the source key matrix 232 to create a target-source attention matrix 216; combining the source-target attention matrix 212 and the target-source attention matrix 216 to generate a source-target vector-edge encoding 276 and a target-source vector-edge encoding 280; biasing and gating the source-target attention matrix 212 and the target-source attention matrix 216 to generate a modified source-target attention matrix and a modified target-source attention matrix, respectively; generating a plurality of source encodings 254 and a plurality of target encodings 258 using the modified source-target attention matrix and the modified target-source attention matrix; configuring a transformer based on the directed graph, and the source encodings 254 and target encoding 258; and performing classification using the configured transformer.

In one aspect, an apparatus comprises a memory and at least one processor, coupled to the memory, and operative to perform operations comprising obtaining a directed graph comprising a plurality of nodes and at least one directed edge with weight, the at least one directed edge connecting two nodes of the plurality of nodes, wherein each node of the directed graph comprises a first pair of vectors, where a source vector 252 of the first pair of vectors encodes a role of the node as a source and a target vector 256 of the first pair of vectors encodes the role of the node as a target; learning a source query matrix 228, a source key matrix 232 and a source value matrix 236, where the source query matrix 228 comprises rows of source query vectors, the source key matrix 232 comprises rows of source key vectors and the source value matrix 236 comprises rows of source value vectors; learning a target query matrix 240, a target key matrix 244 and a target value matrix 248, where the target query matrix 240 comprises rows of target query vectors, the target key matrix 244 comprises rows of target key vectors and the target value matrix 248 comprises rows of target value vectors; projecting and scaling the source query matrix 228 and the target key matrix 244 to create a source-target attention matrix 212 and projecting and scaling the target query matrix 240 and the source key matrix 232 to create a target-source attention matrix 216; combining the source-target attention matrix 212 and the target-source attention matrix 216 to generate a source-target vector-edge encoding 276 and a target-source vector-edge encoding 280; biasing and gating the source-target attention matrix 212 and the target-source attention matrix 216 to generate a modified source-target attention matrix and a modified target-source attention matrix, respectively; generating a plurality of source encodings 254 and a plurality of target encodings 258 using the modified source-target attention matrix and the modified target-source attention matrix; configuring a transformer based on the directed graph, and the source encodings 254 and target encoding 258; and performing classification using the configured transformer.

Figure 4:
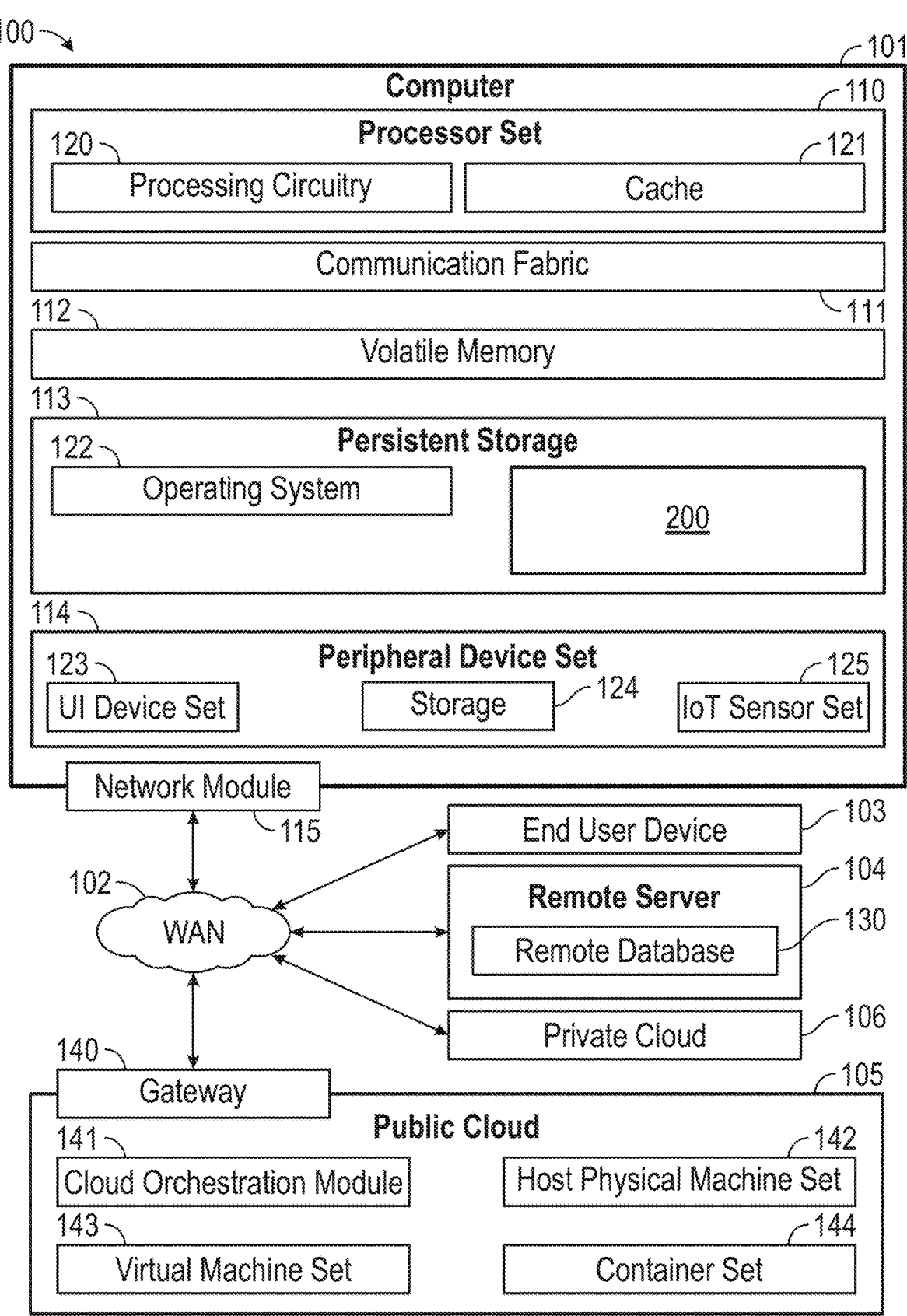
FIG. 4 depicts a computing environment according to an embodiment of the present invention.

Refer now to FIG. 4.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as machine learning system 200 utilizing a directed graph transformer in accordance with aspects of the invention. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for graph analysis via a transformer, the method comprising:

obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target;

inputting the directed graph into the transformer, wherein the transformer:

based on the directed graph, computes a source query matrix, a source key matrix, a target query matrix, and a target key matrix;

projects and scales:

the source query matrix and the target key matrix to create a source-target attention matrix and the target query matrix and the source key matrix to create a target-source attention matrix;

combines the source-target attention matrix and the target-source attention matrix to generate a source-target vector-edge encoding and a target-source vector-edge encoding;

modifies the source-target attention matrix and the target-source attention matrix via biasing and gating;

generates source encodings and target encodings using the modified source-target attention matrix and the modified target-source attention matrix; and performs a classification task with respect to the obtained directed graph based on the generated source encodings and the generated target encodings.

2. A computer-implemented method for graph analysis via a transformer, the method comprising:

obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target;

inputting the directed graph into the transformer, wherein the transformer:

based on the directed graph, computes a source query matrix, a source key matrix, a target query matrix, and a target key matrix;

projects and scales:

the source query matrix and the target key matrix to create a source-target attention matrix and the target query matrix and the source key matrix to create a target-source attention matrix;

combines the source-target attention matrix and the target-source attention matrix to generate a source-target vector-edge encoding and a target-source vector-edge encoding;

modifies the source-target attention matrix and the target-source attention matrix via biasing and gating;

generates source encodings and target encodings using the modified source-target attention matrix and the modified target-source attention matrix; and performs a classification task with respect to the obtained directed graph based on the generated source encodings and the generated target encodings, wherein the classification task comprises identification of malicious software based on directed function call graphs.

3. The computer-implemented method of claim 2, wherein the source query matrix comprises rows of source query vectors and the source key matrix comprises rows of source key vectors.

4. The computer-implemented method of claim 2, wherein the target query matrix comprises rows of target query vectors and the target key matrix comprises rows of target key vectors.

5. The computer-implemented method of claim 2, wherein the transformer further, based on the directed graph, computes a source value matrix and a target value matrix, wherein the source value matrix comprises rows of source value vectors, and wherein the target value matrix comprises rows of target value vectors.

6. The computer-implemented method of claim 5, wherein the source query matrix is defined as $Q_S = SW_{QS}$, the source key matrix is defined as $K_S = SW_{KS}$, the source value matrix is defined as $V_S = SW_{VS}$, the target query matrix is defined as $Q_T = TW_{QT}$, the target key matrix is defined as $K_T = TW_{KT}$, and the target value matrix is defined as $V_T = TW_{VT}$, and where:

$$S \leftarrow softmax\left(\frac{Q_S \cdot K_T^T}{\sqrt{d}}\right) V_T,$$

$$T \leftarrow softmax\left(\frac{Q_T \cdot K_S^T}{\sqrt{d}}\right) V_S,$$

$W_{QS}$ comprises source query weight matrix,
$W_{KS}$ comprises source key weight matrix,
$W_{VS}$ comprises source value weight matrix,
$W_{QT}$ comprises target query weight matrix,
$W_{KT}$ comprises target key weight matrix, and
$W_{VT}$ comprises target value weight matrix.

7. The computer-implemented method of claim 6, wherein the source-target attention matrix and the target-source attention matrix are based on:

$$\bar{A}_{ST} = \frac{Q_S \cdot K_T^T}{\sqrt{d}},$$

$$\bar{A}_{TS} = \frac{Q_T \cdot K_S^T}{\sqrt{d}}.$$

where d is a dimension of the source-target vector-edge encoding and the target-source vector edge encoding.

8. The computer-implemented method of claim 7, wherein each initial source encoding and each initial target encoding are based on:

$$\tilde{A}_{ST} = \left(\bar{A}_{ST} + B_{ST}\right) \odot D_{ST}^{(k)} \quad \tilde{A}_{TS} = \left(\bar{A}_{TS} + B_{TS}\right) \odot D_{TS}^{(k)}$$

where $B_{ST}$ is a source-target bias, $B_{TS}$ is a target-source bias, $D_{ST}^{(k)}$ is a source-target binary k-hop matrix and $D_{TS}^{(k)}$ is a target-source binary k-hop matrix.

9. The computer-implemented method of claim 8, further comprising revising each initial source encoding, designated as S, and each initial target encoding, designated as T, and wherein S and T are defined by $$S = f(L_{VS}(V)) \quad T = f(L_{VT}(V))$$

where $L_{VS}$ and $L_{VT}$ are two linear transformations and f is a non-linear activation with layer norms and residual connections, and wherein V is based on a multiplication by a sigmoid function, $\sigma(\ )$, of entries in gate matrices, $G_{ST}$ and $G_{TS}$, where V is defined by:

$$V = \left(\left(\tilde{A}_{ST} \odot \sigma(G_{ST})\right)V_T\right) + \left(\left(\tilde{A}_{TS} \odot \sigma(G_{TS})\right)V_S\right).$$

10. The computer-implemented method of claim 2, wherein bidirectional relations of the directed graph are learned using recursion.

11. The computer-implemented method of claim 2, further comprising learning bidirectional affinities between all pairs of nodes via nonlinear transforms of the corresponding source encoding S and target encoding T.

12. A computer program product, comprising:
one or more tangible computer-readable storage media and program instructions stored on at least one of the one or more tangible computer-readable storage media, the program instructions executable by a processor to cause the processor to perform operations comprising:
obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target;
inputting the directed graph into a transformer, wherein the transformer:
based on the directed graph, computes a source query matrix, a source key matrix, a target query matrix, and a target key matrix;
projects and scales:
the source query matrix and the target key matrix to create a source-target attention matrix and
the target query matrix and the source key matrix to create a target-source attention matrix;
combines the source-target attention matrix and the target-source attention matrix to generate a source-target vector-edge encoding and a target-source vector-edge encoding;
modifies the source-target attention matrix and the target-source attention matrix via biasing and gating;
generates source encodings and target encodings using the modified source-target attention matrix and the modified target-source attention matrix; and
performs a classification task with respect to the obtained directed graph based on the generated source encodings and the generated target encodings, wherein the classification task comprises identification of malicious software based on the obtained directed graph.

13. A system comprising:
a memory; and
at least one processor, coupled to said memory, and operative to perform operations comprising:
obtaining a directed graph comprising nodes and a directed edge with weight, the directed edge connecting two of the nodes, wherein each node comprises a respective source vector and a respective target vector, the respective source vector encoding a first role of the node as a source and the target vector encoding a second role of the node as a target;

inputting the directed graph into a transformer, wherein the transformer:

based on the directed graph, computes a source query matrix, a source key matrix, a target query matrix, and a target key matrix;

projects and scales:

the source query matrix and the target key matrix to create a source-target attention matrix and the target query matrix and the source key matrix to create a target-source attention matrix;

combines the source-target attention matrix and the target-source attention matrix to generate a source-target vector-edge encoding and a target-source vector-edge encoding;

modifies the source-target attention matrix and the target-source attention matrix via biasing and gating;

generates source encodings and target encodings using the modified source-target attention matrix and the modified target-source attention matrix; and performs a classification task with respect to the obtained directed graph based on the generated source encodings and the generated target encodings, wherein the classification task comprises identification of malicious software based on the obtained directed graph.

14. The system of claim 13, wherein the source query matrix comprises rows of source query vectors and the source key matrix comprises rows of source key vectors.

15. The system of claim 13, wherein the target query matrix comprises rows of target query vectors and the target key matrix comprises rows of target key vectors.

16. The system of claim 13, wherein the transformer further, based on the directed graph, computes a source value matrix and a target value matrix, wherein the source value matrix comprises rows of source value vectors, and wherein the target value matrix comprises rows of target value vectors.

17. The system of claim 16, wherein the source query matrix is defined as $Q_S = SW_{QS}$, the source key matrix is defined as $K_S = SW_{KS}$, the source value matrix is defined as $V_S = SW_{VS}$, the target query matrix is defined as $Q_T = TW_{QT}$, the target key matrix is defined as $K_T = TW_{KT}$, and the target value matrix is defined as $V_T = TW_{VT}$, and where:

$$S \leftarrow softmax\left(\frac{Q_S \cdot K_T^T}{\sqrt{d}}\right)V_T,$$

-continued $$T \leftarrow softmax\left(\frac{Q_T \cdot K_S^T}{\sqrt{d}}\right)V_S,$$

$W_{QS}$ comprises source query weight matrix, $W_{KS}$ comprises source key weight matrix, $W_{VS}$ comprises source value weight matrix, $W_{QT}$ comprises target query weight matrix, $W_{KT}$ comprises target key weight matrix, and $W_{VT}$ comprises target value weight matrix.

18. The system of claim 17, wherein the source-target attention matrix and the target-source attention matrix are based on:

$$\bar{A}_{ST} = \frac{Q_S \cdot K_T^T}{\sqrt{d}},$$

$$\bar{A}_{TS} = \frac{Q_T \cdot K_S^T}{\sqrt{d}}.$$

where d is a dimension of the source-target vector-edge encoding and the target-source vector edge encoding.

19. The system of claim 18, wherein each initial source encoding and each initial target encoding are based on:

$$\tilde{A}_{ST} = (\bar{A}_{ST} + B_{ST}) \odot D_{ST}^{(k)} \quad \tilde{A}_{TS} = (\bar{A}_{TS} + B_{TS}) \odot D_{TS}^{(k)}$$

where $B_{ST}$ is a source-target bias, $B_{TS}$ is a target-source bias, $D_{ST}^{(k)}$ is a source-target binary k-hop matrix and $D_{TS}^{(k)}$ is a target-source binary k-hop matrix.

20. The system of claim 19, the operations further comprising revising each initial source encoding, designated as S, and each initial target encoding, designated as T, and wherein S and T are defined by $$V = ((\tilde{A}_{ST} \odot \sigma(G_{ST}))V_T) + ((\tilde{A}_{TS} \odot \sigma(G_{TS}))V_S).$$

where $L_{VS}$ and $L_{VT}$ are two linear transformations and f is a non-linear activation with layer norms and residual connections, and wherein V is based on a multiplication by a sigmoid function, $\sigma(\ )$, of entries in gate matrices, $G_{ST}$ and $G_{TS}$, where V is defined by:

$$V = ((\tilde{A}_{ST} \odot \sigma(G_{ST}))V_T) + ((\tilde{A}_{TS} \odot \sigma(G_{TS}))V_S).$$

* * * * *